United States Patent
Lee (10) Patent No.: US 7,133,479 B2
(45) Date of Patent: Nov. 7, 2006

(54) FREQUENCY SYNCHRONIZATION APPARATUS AND METHOD FOR OFDM SYSTEMS

(75) Inventor: Tsung-Lin Lee, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 772 days.

(21) Appl. No.: 10/413,526

(22) Filed: Apr. 15, 2003

(65) Prior Publication Data
US 2004/0208267 A1 Oct. 21, 2004

(51) Int. Cl.
*H04L 7/00* (2006.01)
*H04J 3/06* (2006.01)
*H04J 11/00* (2006.01)

(52) U.S. Cl. .................. 375/354; 370/509; 370/210
(58) Field of Classification Search ............. 375/354; 370/509–516, 208–210
See application file for complete search history.

(56) References Cited

U.S. PATENT DOCUMENTS

| 7,042,858 | B1* | 5/2006 | Ma et al. ............... 370/331 |
| 2002/0126618 | A1* | 9/2002 | Kim ..................... 370/208 |
| 2003/0072255 | A1* | 4/2003 | Ma et al. ............... 370/208 |
| 2003/0086366 | A1* | 5/2003 | Branlund et al. ........ 370/208 |
| 2004/0202234 | A1* | 10/2004 | Wang .................... 375/149 |

* cited by examiner

*Primary Examiner*—Khai Tran
*Assistant Examiner*—Cicely Ware
(74) *Attorney, Agent, or Firm*—Birch, Stewart, Kolasch, and Birch, LLP (57) ABSTRACT

A frequency synchronization apparatus and method for OFDM systems. The frequency synchronization apparatus is comprised of a digital mixer, a first synchronizer and a second synchronizer. The digital mixer acquires a baseband signal by means of a local frequency and adjusts the local frequency in response to an integer frequency offset and a fractional frequency offset. The first synchronizer takes a sequence of received samples derived from the baseband signal in a time domain to estimate the fractional frequency offset. The fractional frequency offset is fed back to the digital mixer. After that, the second synchronizer takes a sequence of demodulated symbols derived from the baseband signal in a frequency domain. The second synchronizer yields the integer frequency offset through a coarse search stage and a fine search stage. Then, the integer frequency offset is fed back to the digital mixer.

20 Claims, 5 Drawing Sheets

FREQUENCY SYNCHRONIZATION APPARATUS AND METHOD FOR OFDM SYSTEMS

BACKGROUND OF THE INVENTION

1. Field of the Invention

The invention relates to digital terrestrial television broadcasting, and more particularly to a frequency synchronization technique for Orthogonal Frequency Division Multiplexing (OFDM) systems.

2. Description of the Related Art

Digital Video Broadcasting—Terrestrial (DVB-T) is the European standard for digital video services and the physical layer is based on Orthogonal Frequency Division Multiplexing (OFDM). With the deployment of DVB-T systems, communication channel impairment, arising from adjacent television channels, multipath, and co-channel interference, for example, may appear. OFDM is well known as a highly spectral efficient transmission scheme capable of dealing with severe channel impairment encountered in a wireless environment. The basic idea of OFDM is to divide the available spectrum into several sub-channels (sub-carriers). By making all sub-channels narrowband, they experience almost flat fading, which makes equalization very simple. To obtain a high spectral efficiency the frequency response of the sub-channels are overlapping and orthogonal. This orthogonality can be completely maintained, even though the signal passes through a time-dispersive channel, by introducing a cyclic prefix. A cyclic prefix is a copy of the last part of the OFDM symbol which is pre-appended to the transmitted symbol. This makes the transmitted signal periodic, which plays a decisive role in avoiding inter-symbol and inter-carrier interference.

OFDM can largely eliminate the effects of inter-symbol interference for high-speed transmission in highly dispersive channels with a relatively low implementation cost by separating a single high speed bit stream into a multiplicity of much lower speed bit streams each modulating a different sub-carrier. However, OFDM is known to be vulnerable to synchronization errors, in particular, to frequency errors, due to the narrow spacing between sub-carriers. Frequency offsets are created by differences in oscillators in transmitter and receiver, Doppler shifts, or phase noise introduced by non-linear channels. There are two destructive effects caused by a carrier frequency offset in OFDM systems. One is the reduction of signal amplitude and the other is the introduction of inter-carrier interference from the other carriers. The latter is caused by the loss of orthogonality between the sub-channels. It is found that a multicarrier system is much more sensitive than a single-carrier system. Thus, estimation and removal of the frequency offset from the received signal is most critical in OFDM receivers. In view of the above, what is needed is a robust frequency synchronization scheme suitable for OFDM systems.

SUMMARY OF THE INVENTION

It is an object of the present invention to provide a frequency synchronization apparatus and method for automatic frequency control in OFDM systems.

According to one aspect of the invention, a frequency synchronization apparatus for OFDM systems includes a digital mixer, a first synchronizer and a second synchronizer. The digital mixer acquires a baseband signal by means of a local frequency and adjusts the local frequency in response to an integer frequency offset and a fractional frequency offset. The first synchronizer takes a sequence of received samples derived from the baseband signal in a time domain, estimates the fractional frequency offset, and feeds the estimated fractional frequency offset back to the digital mixer. Thereafter, the second synchronizer takes a sequence of demodulated symbols derived from the baseband signal in a frequency domain, obtains the integer frequency offset through a coarse search stage and a fine search stage, and feeds the integer frequency offset back to the digital mixer.

In a preferred embodiment, the first synchronizer is comprised of a first buffer, a second buffer and a controller. The first buffer stores N previous samples of the received sample sequence to provide an Nth previous sample, where N is a positive integer. The second buffer stores L previously calculated products to provide an Lth previously calculated product, where L is a positive integer less than or equal to N. The controller takes a current sample from the received sample sequence and multiplies it by the conjugate of the Nth previous sample to yield a current product. From the current product and the Lth previously calculated product, the controller computes the moving sum of L most recently calculated products. Based on the moving sum, the fractional frequency offset is thus estimated. Furthermore, the controller writes the current sample to the first buffer to keep as a previous sample and writes the current product to the second buffer to keep as a previously calculated product, respectively.

According to another aspect of the invention, a frequency synchronization method for OFDM systems is disclosed. To begin with, a sequence of received samples derived from a baseband signal is taken in a time domain. A fractional frequency offset is then estimated based on the sequence of received samples. Subsequently, a sequence of demodulated symbols derived from the baseband signal is taken in a frequency domain. During a coarse search stage, a sub-carrier index offset is sought within a first predetermined range based on a currently received symbol, a previously received symbol and a second previously received symbol in the sequence of demodulated symbols. After completion of the coarse search stage, the procedure enters a fine search stage and the sub-carrier index offset is further sought within a second predetermined range based on the currently received, the previously received and the second previously received symbols. Preferably, the first predetermined range is larger than the second predetermined range.

DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
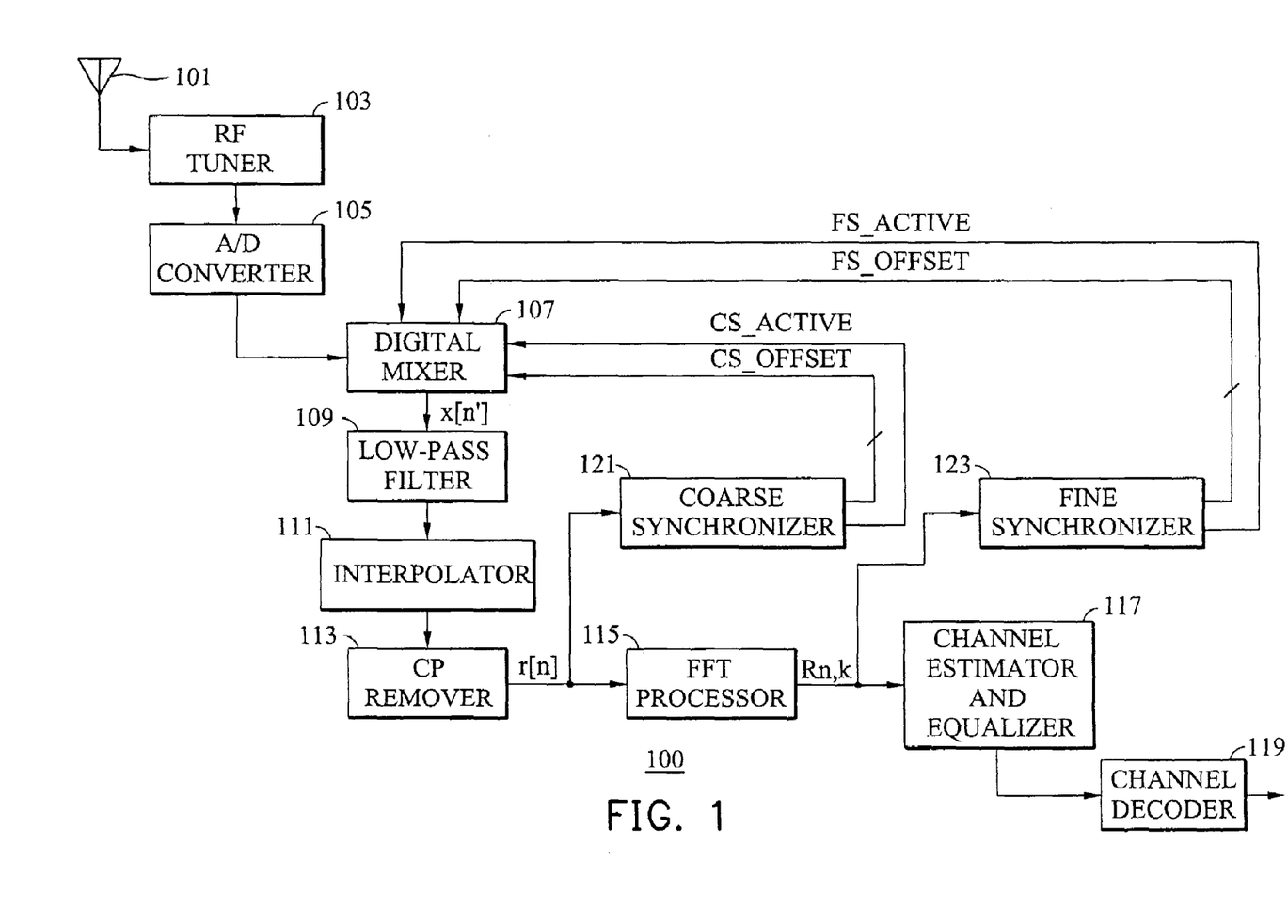
FIG. 1 is a block diagram illustrating an OFDM receiver according to the invention.

FIG. 1 shows a block diagram of an OFDM receiver in accordance with an arrangement of the invention. The receiver 100 conforms to, but is not limited to, the ESTI standard for DVB-T. Briefly, a radio frequency (RF) signal is received via an antenna 101 and its signal band is translated to a lower frequency, namely the intermediate frequency (IF), by an RF tuner 103. The IF signal is then digitized by an A/D converter 105. A digital mixer 107 accepts the digitized IF signal at its input and converts it to baseband. The mixer frequency can be compensated with CS_OFFSET and FS_OFFSET signals from separate synchronizers 121 and 123. The baseband signal x[n'] is digitally filtered via a low-pass filter 109 and subjected to an interpolation by an interpolator 111 before entering the subsequent FFT processor 115. The interpolator output signal is first manipulated by a CP remover 113, which performs deletion of the cyclic prefix (CP) and yields a sequence of received samples r[n]. The FFT processor 115 applies a Fast Fourier Transform (FFT) and demodulation to the output of the CP remover 113, r[n]. Hence, the received sample sequence r[n] is transformed from time domain to frequency domain. In DVB-T, two modes of operation are defined: a "2K model" and an "8K model". Therefore the FFT processor 115 must be capable of performing a 2048-point FFT in the 2K mode or an 8192-point FFT in the 8K mode. The FFT result $R_{n,k}$ is processed by a channel estimator and equalizer 117, which performs two functions: channel estimation and frequency equalization. The output of the channel estimator and equalizer 117 is then fed to a channel decoder 119 to recover transmitted data.

The present invention mainly focuses on frequency synchronization and compensation realized by the digital mixer 107, the coarse synchronizer 121 and the fine synchronizer 123. Basically, the frequency offset, Δf, is divided into two parts and can be expressed as:

$$\Delta f = (m+\epsilon)/T_U$$

where m is an integer part, $\epsilon$ is a fractional part, and $T_U$ is the time duration of an OFDM symbol without the cyclic prefix. Since $T_U$ is the inverse of the sub-carrier spacing, an integer frequency offset represents a multiple of the sub-carrier spacing and a fractional frequency offset represents an error less than the sub-carrier spacing, respectively. Still referring to FIG. 1, the digital mixer 107 acquires the baseband signal x[n'] by means of a local frequency, i.e. the mixer frequency, and adjusts the local frequency in response to the integer frequency offset (FS_OFFSET) and the fractional frequency offset (CS_OFFSET). A first synchronizer, namely the coarse synchronizer 121, takes the sequence of received samples r[n] derived from the baseband signal in the time domain to estimate the fractional frequency offset and feeds the estimated fractional frequency offset back to the digital mixer 107. After compensation of the fractional frequency offset, a second synchronizer, namely the fine synchronizer 123, takes the sequence of demodulated symbols $R_{n,k}$ derived from the baseband signal in the frequency domain to obtain the integer frequency offset through a coarse search stage and a fine search stage. As well, the estimated integer frequency offset is fed back to the digital mixer 107 to further adjust the local frequency. Notably, the fine synchronizer 123 searches for the integer frequency offset within a first predetermined range during the coarse search stage and within a second predetermined range during the fine search stage, in which the first predetermined range is larger than the second predetermined range.

Figure 2:
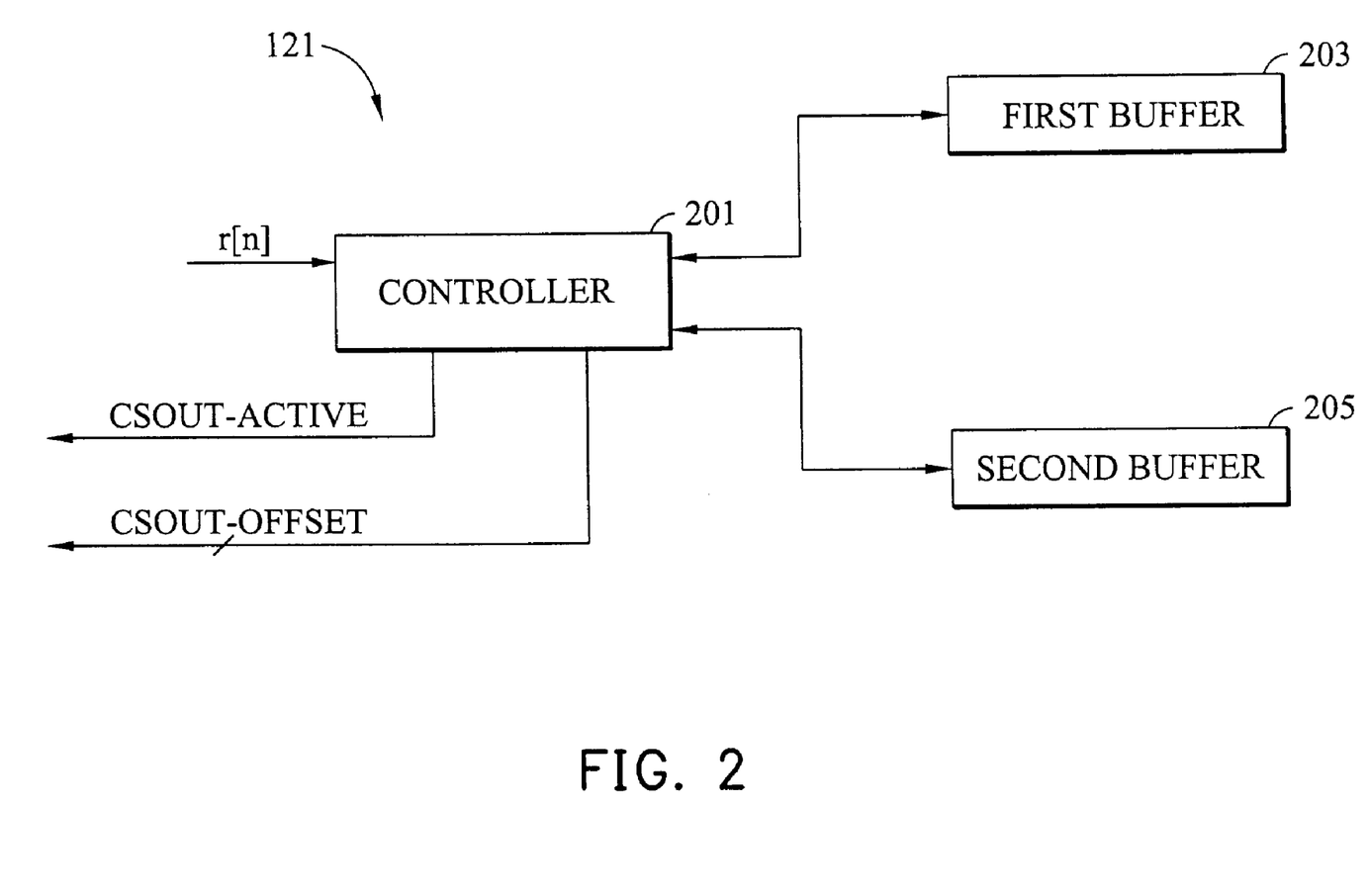
FIG. 2 is a detailed block diagram illustrating a coarse synchronizer of FIG. 1.

The coarse synchronizer 121 estimates the fractional frequency offset, $\epsilon$, by:

$$\varepsilon = \frac{1}{2\pi N} \arg\left(\sum_{n=0}^{L-1} r[n] \cdot r^*[n-N]\right)$$

where r[n] represents the current sample at time instant n in the received sample sequence, r[n−N] represents the Nth previous sample in the received sample sequence, superscript * denotes complex conjugation, and arg(.) denotes an argument function. Referring to FIG. 2, a detailed block diagram of the coarse synchronizer 121 is illustrated. In this embodiment, the coarse synchronizer 121 is made up of a first buffer 203, a second buffer 205 and a controller 201. The first buffer 203 stores N previous samples of the received sample sequence to provide the Nth previous sample. Preferably, the first buffer 203 has a buffer length of N equal to the FFT size in the OFDM receiver 100. The second buffer 205 stores L previously calculated products to provide the Lth previously calculated product, where L represents the length of the second buffer 205 and L≦N. The controller 201 takes the current sample r[n] from the output of the CP remover 113, reads the Nth previous sample r[n−N] from the first buffer 203, as well as reads the Lth previously calculated product c[n−L] from the second buffer 205. At the controller 201, the current sample r[n] is multiplied by the conjugate of the Nth previous sample, r*[n−N], to yield the current product: c[n]=r[n]·r*[n−N]. The controller 201 now writes r[n] to the first buffer 203 to replace r[n−N]. In this manner, the first buffer 203 keeps the current sample r[n] as the previous sample r[n−1] every time for the following operation. Meanwhile, from the current product c[n] and the Lth previously calculated product c[n−L], the controller 201 computes the moving sum of L most recently calculated products by adding c[n] and subtracting c[n−L]. The controller 201 also writes the current product c[n] to the second buffer 205 to keep as the previously calculated product c[n−1]. After receiving and computing L most recent samples of the received sample sequence, the moving sum is accomplished so $$\sum_{n=0}^{L-1} r[n] \cdot r^*[n-N]$$

is realized. Based on the moving sum, the fractional frequency offset is given by $$\varepsilon = \frac{1}{2\pi N} \arg\left(\sum_{n=0}^{L-1} r[n] \cdot r^*[n-N]\right).$$

When $\epsilon$ is estimated, the controller 201 asserts a CS_ACTIVE signal to notify the digital mixer 107 and provides the estimated fractional frequency offset via the CS_OFFSET signal. According to the invention, the coarse synchronizer 121 performs estimation of the fractional frequency offset one time only and releases system resources after estimation by shutdown.

In DVB-T systems, the OFDM signal is modulated on 1,705 sub-carriers in the 2K mode and 6,817 in the 8K mode. In addition, these sub-carriers include four different types of carriers: which are data carriers, continual pilots, scattered pilots and TPS pilots. Their positions are well defined by the DVB-T standard. For each OFDM symbol, continual pilots transmit exactly the same known information. Frequency synchronization can takes advantage of this characteristic because a fixed frequency offset rotates all sub-carriers with the same phase from symbol to symbol. After compensation of the fractional frequency offset, the fine synchronizer 123 initiates and accepts the output of the FFT processor 115 at its input to calculate two sequences of complex products at sub-carrier index k, $C_{n-1,k}$ and $C_{n,k}$, from three consecutive demodulated symbols at time instants n−2, n−1 and n, by:

$$C_{n-1,k} = R_{n-1,k} \cdot R_{n-2,k}^*$$

and $$C_{n,k} = R_{n,k} \cdot R_{n-1,k}^*$$

where $R_{n,k}$, $R_{n-1,k}$ and $R_{n-2,k}$ represent a currently received, previously received and second previously received symbol in the sequence of demodulated symbols, respectively. The fine synchronizer 123 further computes a sequence of complex second-order products, $D_{n,k}$, by:

$$D_{n,k} = C_{n,k} \cdot C_{n-1,k}^*$$

Figure 3:
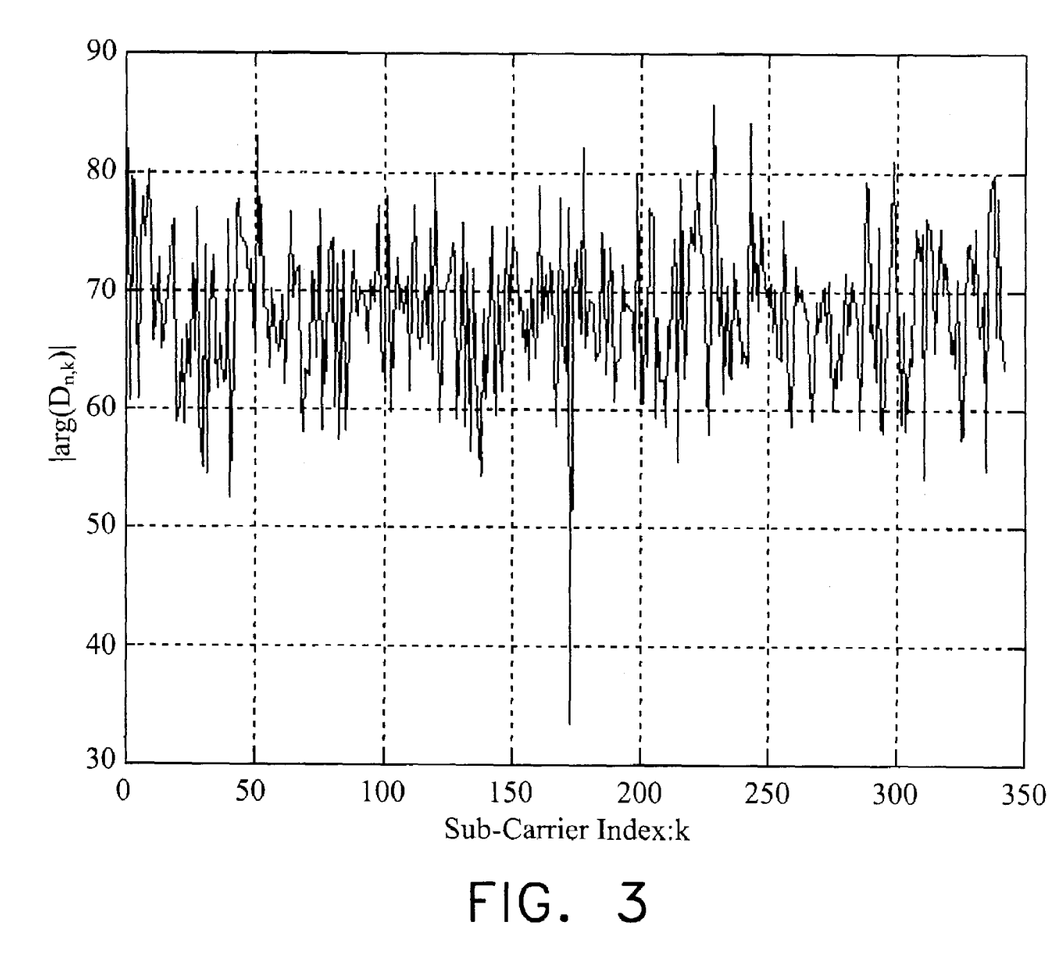
FIG. 3 is a graph showing a simulation result of a fine synchronizer.

Then, for a group of continual pilot carriers $\{CP_0, \ldots, CP_w\}$ selected from 45 continual pilots in the 2K mode and 177 in the 8 K mode, the fine synchronizer 123 seeks a sub-carrier index offset $k_o$ using the following equation:

$$k_o = \min_{k_i} \left( \sum_{k=k_i+CP_0}^{k_i+CP_w} |\arg(D_{n,k})| \right), \quad k_i = -M, \cdots -1, 0, 1, \cdots, M$$

where −M and M define a search window. As the continual pilots always carry the same information, then the phase of the second correlation, i.e. $\arg(D_{n,k})$, shall be zero for all continual pilots and random values for other sub-carriers. Therefore, knowing the theoretical positions of the continual pilots, it is possible to search within the known positions of the continual pilots so as to locate the sub-carrier index offset $k_o$ corresponding to a minimum value. It can be seen from the simulation result of FIG. 3. When the integer frequency offset is estimated from the sub-carrier index offset $k_o$, the fine synchronizer 123 asserts a FS_ACTIVE signal to notify the digital mixer 107 and provides the estimated integer frequency offset via the FS_OFFSET signal.

Figure 4:
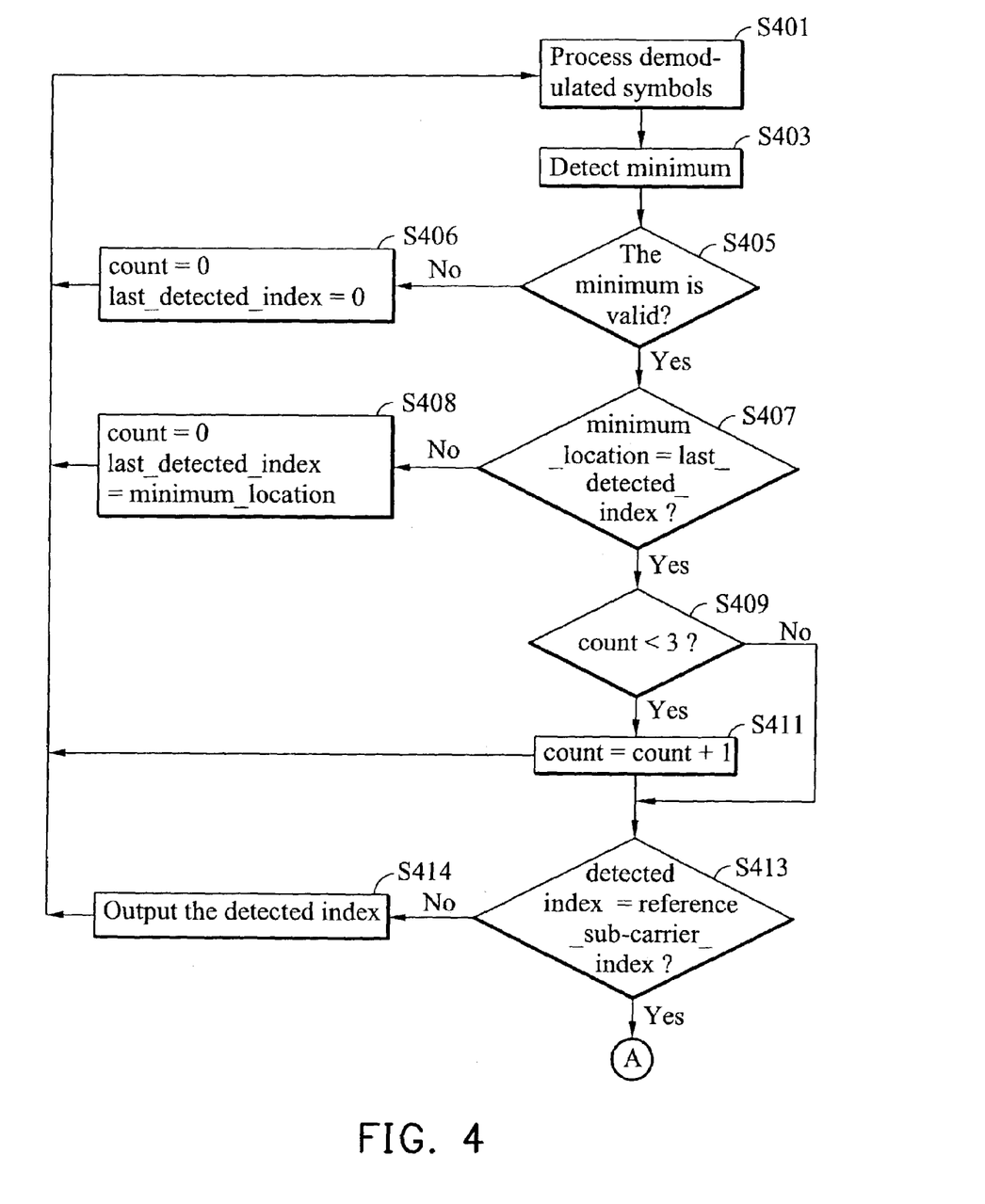
FIG. 4 is a flowchart illustrating the primary operational steps executed by the fine synchronizer during a coarse search stage.
Figure 5:
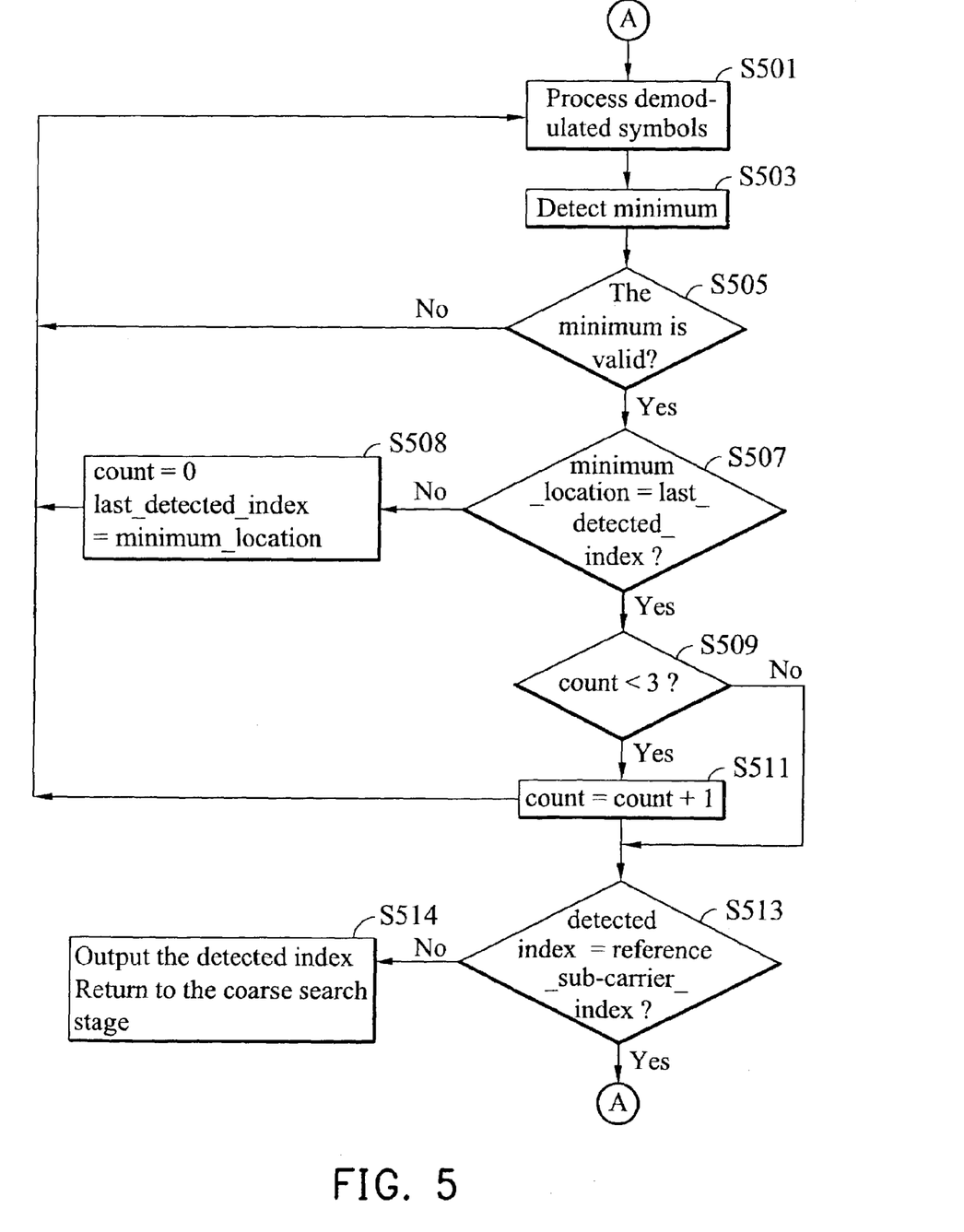
FIG. 5 is a flowchart illustrating the primary operational steps executed by the fine synchronizer during a fine search stage.

The operations of the fine synchronizer 123 will be more clearly explained in conjunction with FIGS. 4 and 5. To begin with, the fine synchronizer 123 enters the coarse search stage and takes the sequence of demodulated symbols to compute $D_{n,k}$ for the group of continual pilot carriers $\{CP_0, \ldots, CP_w\}$ (step S401). Then a valid minimum of $$\sum_{k=k_i+CP_0}^{k_i+CP_w} |\arg(D_{n,k})|$$

is detected over a coarse search window consistent with the first predetermined range (step S403). In one embodiment, the first predetermined range is defined between 200 and −200. In this regard, the detection is valid if the minimum of $$\sum_{k=k_i+CP_0}^{k_i+CP_w} |\arg(D_{n,k})|$$

for all $k_i$ is less than the second minimum thereof scaled by a factor of 0.8, for example (step S405). If the detection at this time is invalid, a count for valid detection and a last detected index are cleared (step S406). In this condition, the fine synchronizer 123 proceeds back to step S401. If the detection is valid but the last detected index is not equal to the minimum location (step S407), namely the index $k_i$ corresponding to the valid minimum, then the count for valid detection is cleared, the index $k_i$ corresponding to the valid minimum is stored in the last detected index (step S408), and the fine synchronizer 123 proceeds back to step S401. If the last detected index is equal to the minimum location, the fine synchronizer 123 proceeds to step S409 where it determines whether the count for valid detection reaches a predetermined number of 3, for example. The count is now increased by one, provided that the count for valid detection is less than the predetermined number (step S411). When the count for valid detection is increased consecutively and reaches the predetermined number, the index $k_i$ corresponding to the valid minimum is output as the sub-carrier index offset $k_o$ (step S414). The fine synchronizer 123 does not enter the fine search stage for frequency tracking until the detected sub-carrier index offset $k_o$ is the same as a reference sub-carrier index (step S413).

During the fine search stage, the fine synchronizer 123 also takes the sequence of demodulated symbols and computes $D_{n,k}$ for the group of continual pilot carriers $\{CP_0, \ldots, CP_w\}$ (step S501). The valid minimum of $$\sum_{k=k_i+CP_0}^{k_i+CP_w} |\arg(D_{n,k})|$$

is then detected over a fine search window consistent with the second predetermined range (step S503). In one embodiment, the second predetermined range is defined between 2 and −2. The fine synchronizer 123 determines whether the detection at this time is invalid or not (step S505). If not, the fine synchronizer 123 proceeds back to step S501. If the detection is valid but the last detected index is not equal to the minimum location (step S507), the count for valid detection is cleared, the index $k_i$ corresponding to the valid minimum is stored in the last detected index (step S508), and the fine synchronizer 123 proceeds back to step S501. If the last detected index is equal to the minimum location, the fine synchronizer 123 proceeds to step S509 where it determines whether the count for valid detection reaches the predetermined number of 3, for example. The count is now increased by one, provided that the count for valid detection is less than the predetermined number (step S511). When the count for valid detection is increased consecutively and reaches the predetermined number, the fine synchronizer 123 determines whether the detected index $k_i$ corresponding to valid minimum and the reference sub-carrier index are the same (step S513). If so, the fine search stage is re-initialized and starts again. Otherwise, the index $k_i$ corresponding to the valid minimum is output as the sub-carrier index offset $k_o$ and the fine synchronizer 123 returns to the coarse search stage (step S514).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A frequency synchronization apparatus for OFDM systems, comprising:
    a digital mixer for acquiring a baseband signal by means of a local frequency and adjusting the local frequency in response to an integer frequency offset and a fractional frequency offset;
    a first synchronizer for taking a sequence of received samples derived from the baseband signal in a time domain, estimating the fractional frequency offset, and feeding the fractional frequency offset back to the digital mixer, comprising:
        a first buffer for storing N previous samples of the received sample sequence to provide an Nth previous sample, where N is a first positive integer;
        a second buffer for storing L previously calculated products to provide an Lth previously calculated product, where L is a second positive integer and $L \leq N$; and
        a controller for taking a current sample from the received sample sequence, multiplying the current sample by a conjugate of the Nth previous sample to yield a current product, writing the current sample to the first buffer to keep as a previous sample, computing a moving sum of L most recently calculated products from the current product and the Lth previously calculated product, writing the current product to the second buffer to keep as a previously calculated product, and estimating the fractional frequency offset based on the moving sum;
    a second synchronizer for taking a sequence of demodulated symbols derived from the baseband signal in a frequency domain, obtaining the integer frequency offset through a coarse search stage and a fine search stage, and feeding the integer frequency offset back to the digital mixer.

2. The frequency synchronization apparatus of claim 1 wherein the second synchronizer searches for the integer frequency offset within a first predetermined range during the coarse search stage and within a second predetermined range during the fine search stage, where the first predetermined range is larger than the second predetermined range.

3. The frequency synchronization apparatus of claim 2 wherein the second synchronizer seeks a sub-carrier index offset $k_o$ using the following equation for a group of continual pilot carriers $\{CP_0, \ldots, CP_w\}$ in the OFDM systems:

$$k_o = \min_{k_i} \left( \sum_{k=k_i+CP_0}^{k_i+CP_w} |\arg(D_{n,k})| \right), \quad k_i = -M, \cdots -1, 0, 1, \cdots, M$$

where $-M$ and M define a search window, arg(.) denotes an argument function, and $D_{n,k}$ is given by:

$$D_{n,k} = C_{n,k} \cdot C_{n-1,k}^*$$

where superscript * denotes complex conjugation, and $C_{n,k}$, $C_{n-1,k}$ are calculated at sub-carrier index k, by:

$$C_{n-1,k} = R_{n-1,k} \cdot R_{n-2,k}^* \text{ and } C_{n,k} = R_{n,k} \cdot R_{n-1,k}^*$$

where $R_{n,k}$, $R_{n-1,k}$ and $R_{n-2,k}$ represent a currently received, previously received and second previously received symbol in the sequence of demodulated symbols at time instants n, n−1 and n−2, respectively.

4. The frequency synchronization apparatus of claim 3 wherein the second synchronizer estimates the integer frequency offset based on the sub-carrier index offset $k_o$.

5. The frequency synchronization apparatus of claim 3 wherein the second synchronizer applies the search window of ±M consistent with the first predetermined range to seek the sub-carrier index offset $k_o$ during the coarse search stage.

6. The frequency synchronization apparatus of claim 3 wherein the second synchronizer applies the search window of ±M consistent with the second predetermined range to seek the sub-carrier index offset $k_o$ during the fine search stage.

7. The frequency synchronization apparatus of claim 1 wherein the first synchronizer estimates the fractional frequency offset, $\epsilon$, by:

$$\varepsilon = \frac{1}{2\pi N} \arg\left( \sum_{n=0}^{L-1} r[n] \cdot r^*[n-N] \right)$$

where r[n] represents the current sample from the received sample sequence, r[n−N] represents the Nth previous sample read from the first buffer, $r[n] \cdot r^*[n-N]$ is the current product to be written to the second buffer, superscript * denotes complex conjugation, and arg(.) denotes an argument function.

8. The frequency synchronization apparatus of claim 1 wherein the first buffer has a length of N equal to a FFT size in the OFDM systems.

9. The frequency synchronization apparatus of claim 1 further comprising means, coupled between the first and the second synchronizers, for performing an N-point FFT to transform the baseband signal from the time domain to the frequency domain.

10. The frequency synchronization apparatus of claim 1 wherein the basedband signal is compliant with a standard of Digital Video Broadcasting—Terrestrial (DVB-T).

11. A frequency synchronization method for OFDM systems, comprising the steps of:
    taking a sequence of received samples derived from a baseband signal in a time domain;
    estimating a fractional frequency offset based on the sequence of received samples;
    subsequently taking a sequence of demodulated symbols derived from the baseband signal in a frequency domain;
    seeking a sub-carrier index offset within a first predetermined range during a coarse search stage based on a currently received symbol, a previously received symbol and a second previously received symbol in the sequence of demodulated symbols;
    after completion of the coarse search stage, further seeking the sub-carrier index offset within a second predetermined range during a fine search stage based on the currently received, the previously received and the second previously received symbols in the sequence of demodulated symbols; and estimating an integer frequency offset in accordance with the sub-carrier index offset;

wherein the first predetermined range is larger than the second predetermined range.

12. The frequency synchronization method of claim 11 wherein the seeking step during the coarse search stage comprises the steps of:

calculating two sequences of complex products at sub-carrier index k, $C_{n-1,k}$ and $C_{n,k}$, from the currently received symbol at time instant n, $R_{n,k}$, the previously received symbol at time instant n-1, $R_{n-1,k}$, and the second previously received symbol at time instant n-2, $R_{n-2,k}$, by:

$C_{n-1,k} = R_{n-1,k} \cdot R_{n-2,k}^*$ and $C_{n,k} = R_{n,k} \cdot R_{n-1,k}^*$ where superscript * denotes complex conjugation;

computing a sequence of complex second-order products, $D_{n,k}$, by $D_{n,k} = C_{n,k} \cdot C_{n-1,k}^*$;

determining the sub-carrier index offset $k_o$ by the following equation for a group of continual pilot carriers $\{CP_0, \ldots, CP_w\}$ in the OFDM systems:

$$k_o = \min_{k_i}\left(\sum_{k=k_i+CP_0}^{k_i+CP_w} |\arg(D_{n,k})|\right), \quad k_i = -M, \cdots -1, 0, 1, \cdots, M$$

where M and −M define a coarse search window, and arg(.) denotes an argument function.

13. The frequency synchronization method of claim 12 wherein the determining step during the coarse search stage comprises the steps of:

detecting a valid minimum of $$\sum_{k=k_i+CP_0}^{k_i+CP_w} |\arg(D_{n,k})|$$

over the coarse search window between −M and M;

increasing a count for valid detection if a last detected index is equal to the index $k_i$ corresponding to the valid minimum; and outputting the index $k_i$ corresponding to the valid minimum as the sub-carrier index offset $k_o$ if the count for valid detection is increased consecutively and reaches a predetermined number.

14. The frequency synchronization method of claim 13 wherein the coarse search window of ±M during the coarse search stage is consistent with the first predetermined range.

15. The frequency synchronization method of claim 11 wherein the seeking step during the fine search stage comprises the steps of:

calculating two sequences of complex products at sub-carrier index k, $C_{n-1,k}$ and $C_{n,k}$, from the currently received symbol at time instant n, $R_{n,k}$, the previously received symbol at time instant n-1, $R_{n-1,k}$, and the second previously received symbol at time instant n-2, $R_{n-2,k}$, by:

$C_{n-1,k} = R_{n-1,k} \cdot R_{n-2,k}^*$ and $C_{n,k} = R_{n,k} \cdot R_{n-1,k}^*$ where superscript * denotes complex conjugation;

computing a sequence of complex second-order products, $D_{n,k}$, by $D_{n,k} = C_{n,k} \cdot C_{n-1,k}^*$ determining the sub-carrier index offset $k_o$ by the following equation for a group of continual pilot carriers $\{CP_0, \ldots, CP_w\}$ in the OFDM systems:

$$k_o = \min_{k_i}\left(\sum_{k=k_i+CP_0}^{k_i+CP_w} |\arg(D_{n,k})|\right), \quad k_i = -M, \ldots -1, 0, 1, \ldots, M$$

where M and −M define a fine search window, and arg(.) denotes an argument function.

16. The frequency synchronization method of claim 15 wherein the determining step during the fine search stage comprises the steps of:

detecting a valid minimum of $$\sum_{k=k_i+CP_0}^{k_i+CP_w} |\arg(D_{n,k})|$$

over the fine search window between −M and M;

if the valid minimum is detected and a last detected index is not equal to the index $k_i$ corresponding to the valid minimum, re-starting the seeking step of the fine search stage;

if the valid minimum is detected and the last detected index is equal to the index $k_i$ corresponding to the valid minimum, then increasing a count for valid detection;

re-starting the seeking step of the fine search is stage if the count for valid detection is less than a predetermined number;

if the count for valid detection is increased consecutively and reaches the predetermined number, then:

re-starting the seeking step of the fine search stage if the index $k_i$ corresponding to the valid minimum is equal to the reference sub-carrier index; and outputting the index $k_i$ corresponding to the valid minimum as the sub-carrier index offset $k_o$ and re-starting the seeking step of the coarse search step if the index $k_i$ corresponding to the valid minimum is not equal to the reference sub-carrier index.

17. The frequency synchronization method of claim 16 wherein the fine search window of ±M during the fine search stage is consistent with the fine predetermined range.

18. The frequency synchronization method of claim 11 wherein the fractional frequency offset, $\epsilon$, is given by:

$$\varepsilon = \frac{1}{2\pi N} \arg\left(\sum_{n=0}^{L-1} r[n] \cdot r^*[n-N]\right)$$

where r[n] represents a currently received sample at time instant n, r[n−N] represents an Nth previously received sample at time instant n−N, superscript * denotes complex conjugation, arg(.) denotes an argument function, and N, L are positive integers.

19. The frequency synchronization method of claim 11 further comprising the step of performing an N-point FFT to transform the baseband signal from the time domain to the frequency domain.

20. The frequency synchronization method of claim 11 wherein the basedband signal is compliant with a standard of Digital Video Broadcasting—Terrestrial (DVB-T).

* * * * *